(12) United States Patent
Bardon et al.

(10) Patent No.: US 8,105,543 B2
(45) Date of Patent: Jan. 31, 2012

(54) SILICON CARBIDE BASED STRUCTURE FOR FILTRATING GAS

(75) Inventors: Sébastien Bardon, Cambridge, MA (US); Vincent Gleize, Avignon (FR); Patrick Girot, Salon de Provence (FR)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 798 days.

(21) Appl. No.: 12/095,065

(22) PCT Filed: Nov. 29, 2006

(86) PCT No.: PCT/FR2006/051254
§ 371 (c)(1),
(2), (4) Date: Sep. 24, 2008

(87) PCT Pub. No.: WO2007/063249
PCT Pub. Date: Jun. 7, 2007

(65) Prior Publication Data
US 2009/0226347 A1  Sep. 10, 2009

(30) Foreign Application Priority Data
Nov. 30, 2005  (FR) ..................... 05 53665

(51) Int. Cl.
*B01D 50/00* (2006.01)
*F01N 3/00* (2006.01)
(52) U.S. Cl. .......... 422/171; 422/177; 55/523; 264/682; 95/273; 95/285
(58) Field of Classification Search ............ 422/171, 422/177; 55/523; 264/682; 428/117, 304.4; 95/285, 273
See application file for complete search history.

(56) References Cited

U.S. PATENT DOCUMENTS

| 5,733,352 | A | * | 3/1998 | Ogawa et al. ............... 55/523 |
| 5,849,460 | A | | 12/1998 | Kawai et al. |
| 5,914,187 | A | | 6/1999 | Naruse et al. |
| 6,773,481 | B2 | * | 8/2004 | Noguchi et al. ............. 55/523 |
| 6,890,616 | B2 | * | 5/2005 | Suwabe et al. ............. 428/117 |
| 7,029,511 | B2 | * | 4/2006 | Ichikawa et al. ............ 55/523 |
| 7,524,360 | B2 | * | 4/2009 | Cheng ........................ 95/273 |
| 7,648,550 | B2 | * | 1/2010 | Beall et al. .................. 55/523 |
| 7,658,779 | B2 | * | 2/2010 | Carranza et al. ............ 55/523 |
| 2003/0093982 | A1 | | 5/2003 | Suwabe et al. |

FOREIGN PATENT DOCUMENTS

| EP | 1 142 619 A1 | 10/2001 |
| EP | 1 264 971 A1 | 12/2002 |
| EP | 1 514 588 A1 | 3/2005 |
| JP | 2001-162119 | 6/2001 |
| JP | 2004-148308 | 5/2004 |
| JP | 2004-330118 | 11/2004 |
| JP | 2004-360654 | 12/2004 |
| JP | 2005-534597 | 11/2005 |
| WO | WO2004/069397 | 8/2004 |

* cited by examiner

*Primary Examiner* — Nina Bhat
(74) *Attorney, Agent, or Firm* — Oblon, Spivak, McClelland, Maier & Neustadt, L.L.P.

(57) ABSTRACT

The present invention relates to a structure, for filtering particulate-laden gases, of the honeycomb type and containing an assembly of adjacent ducts or channels, whose axes are parallel to one another, separated by porous walls, the ducts being sealed off by plugs at one or other of their ends so as to form inlet chambers opening onto a gas entry face and outlet chambers opening onto a gas exit face, in such a way that the gas to be filtered passes through the porous walls, wherein said walls comprise material based on silicon carbide and the walls have an open porosity of between 30 and 53%; a median pore diameter of between 9 and 20 μm; the average number of open pores on the surface of the walls, the opening area of which is between 20 and 310 μm$^2$, is greater than 300 per mm$^2$ of wall; and the ratio of the total opening area of said open pores to said area of the walls is between 0.15 and 0.30.

20 Claims, No Drawings

SILICON CARBIDE BASED STRUCTURE FOR FILTRATING GAS

The present application claims domestic priority to PCT Application No. FR06/51254, filed on Nov. 29, 2006, and claims foreign priority to French Application No. 05/53665, filed on Nov. 30, 2005. The text of both PCT/FR06/51254 and FR05/53665 are herein incorporated by reference.

The invention relates to the field of filtering structures, which may comprise a catalytic component, used for example in an exhaust line of an internal combustion engine of the diesel type.

Filters for the treatment of gases and for eliminating soot particles typically coming from a diesel engine are well known in the prior art. These structures usually all have a honeycomb structure, one of the faces of the structure allowing entry of the exhaust gases to be treated and the other face for exit of the treated exhaust gases. The structure comprises, between the entry and exit faces, an assembly of adjacent ducts or channels, whose axes are parallel to one other, separated by porous walls. The ducts are sealed off at one or other of their ends in order to form inlet chambers opening onto the entry face and outlet chambers opening onto the exit face. The channels are alternately closed off in an order such that, in the course of their passage through the honeycomb body, the exhaust gases are forced to pass through the sidewalls of the inlet channels in order to rejoin the outlet channels. In this way, the particulates or soot particles are deposited and accumulate on the porous walls of the filter body.

Currently, for gas filtration, filters made from a porous ceramic material are used, for example made from cordierite, from alumina, from mullite, from silicon nitride, from a silicon/silicon carbide mixture or from silicon carbide.

In a known manner, during use, the particulate filter is subjected to a succession of filtration (soot accumulation) and regeneration (soot elimination) phases. During the filtration phases, the soot particles emitted by the engine are retained and deposited inside the filter. During the regeneration phases, the soot particles are burnt off inside the filter, in order to restore its filtering properties to it. One important criterion involved in the implementation of a filter, for example in the exhaust line of an engine, is therefore its thermomechanical resistance.

It is furthermore known that the introduction of a particulate filter such as previously described into the exhaust line of an engine leads to a pressure drop likely to impair the performance parameters of the latter. Consequently, the filter must be configured in such a manner as to avoid such an impairment.

Another critical criterion for the selection of the, optionally, catalytic filtering structures previously described is their soot deposition time. This time corresponds to the time period required for the filter to reach its maximum filtering efficiency level, when it is first implemented or following a regeneration phase. It is assumed that this time depends, in particular, on the deposition of a sufficient quantity of soot within the porosity of the filter in order to impede the direct passage of fine soot particles through the walls of the filter. One of the direct consequences of a maladapted soot deposition time is the appearance of persistent and noxious black fumes, together with the presence of traces of soot at the outlet of the exhaust line, on a new filter or after a regeneration phase. It goes without saying that, for reasons of environmental impact, of image and of comfort of use, automobile manufacturers would like the occurrence of such phenomena to be eliminated or at least minimized on vehicles fitted with such filters.

The deposition of soot is a poorly understood phenomenon, owing without doubt to the fact that the mass of deposit is not measurable in real time on a filter during use. Indeed, only the soot deposition time, measured indirectly based on the analysis of the concentration of particulates present in the exhaust gases at the outlet of the filter, is accessible.

The present invention relates to the field of silicon carbide filters, preferably obtained by sintering/recrystallization (R—SiC). Examples of catalytic filters according to the invention are for example described in the patent applications EP 816 065, EP 1 142 619, EP 1 455 923 or else WO 2004/065088 to which reference will be made for a more detailed description of their structure or their mode of synthesis. The structures according to the invention may be simple monolithic structures or, preferably, more complex assembled structures, usually obtained by the association of several monolithic elements, bonded by a cement referred to as sealing cement.

The object of the present invention is thus to provide a novel honeycomb structure, possibly comprising a catalytic component, that allows all of the aforementioned problems to be solved.

The invention thus relates to a filtering structure combining, for a maximum filtration efficiency and long-term use, the following properties:
  a minimum pressure drop during operation, typically on an exhaust line of an internal combustion engine;
  a thermomechanical resistance sufficient to withstand the operational constraints of the filter; and
  an optimized filtering efficiency as soon as the filter is implemented or after a regeneration phase, resulting in a minimized soot deposition time.

Such a structure is especially applicable as a particulate filter in an exhaust line of a diesel or gasoline engine.

In its most general form, the present invention relates to a structure for filtering particulate-laden gases, of the honeycomb type and comprising an assembly of adjacent ducts or channels, whose axes are parallel to one another, separated by porous walls, said ducts being sealed off by plugs at one or other of their ends so as to form inlet chambers opening onto a gas entry face and outlet chambers opening onto a gas exit face, in such a way that the gas to be filtered passes through the porous walls, said structure being characterized in that the material based on silicon carbide constituting said walls has:
  an open porosity of between 30 and 53%, preferably between 40 and 50% and very preferably between 43 and 49%;
  a median pore diameter of between 9 and 20 µm, preferably between 12 and 18 µm;
and in that:
  the average number of open pores on the surface of the walls, the opening area of which is between 20 and 310 $m^2$, is greater than 300 per $mm^2$ of wall, preferably greater than 350 per $mm^2$ of wall; and
  the ratio of the total opening area of said open pores to said area of the walls is between 0.15 and 0.30, preferably between 0.20 and 0.27.

The term "SiC-based material" is understood within the context of the present description to mean that said material comprises at least 30% SiC by weight, preferably at least 70% SiC by weight and very preferably at least 98% SiC by weight.

The term "median pore diameter" is understood within the context of the present description to mean the pore diameter for which 50% by volume of the pores is equal to or less than this pore size.

The open pores on the surface of the walls, the opening area of which is between 20 and 310 μm², are, within the context of the present description, the pores of which the opening area on the channels corresponds approximately to the area of a perfect disk, the diameter of which is between about 5 μm and about 20 μm.

The structure according to the invention may further include a catalytic coating for treating pollutant gases of the CO or HC type, coating being present for example on the surface and in the porosity of the walls.

The thickness of the walls of the structures according to the invention is typically between 200 and 500 μm.

In general, the pore size distribution is of a unimodal type.

According to a preferred embodiment of the invention, the present filtering structure comprises a plurality of honeycomb filtering elements joined together by a jointing cement, the number of channels typically being around 7.75 to 62 per cm², said channels having a cross section ranging from 0.5 to 9 mm².

The invention also relates to a process for manufacturing the above-described SiC-based filtering structures, which comprises: a step of mixing the initial mixture with at least one pore-forming agent, preferably chosen from the group consisting of polyethylene, polystyrene, starch and graphite, for example as described in applications JP 08-281036 or EP 1 541 538. The mixing results in a homogeneous product in the form of a bound paste. The process further includes a step of extruding said product through a suitable die so as to form honeycomb monoliths; a step of drying the monoliths obtained; and, optionally, an assembly step and a firing step, said process being characterized in that at least one of the parameters within the group consisting of the size of the particles of the initial mixture, the nature and the amount of the pore-forming agent(s) and the firing temperature, is controlled so as to obtain said structure.

According to one possible method of implementation, the silicon carbide is introduced in the form of a powder, said powder having at least two types of particle size, for example in the form of a first population of particles, the median diameter of which is between 10 and 100 μm, preferably between 10 and 50 μm, and a second population of particles, the median diameter of which is between 0.1 and 10 μm, preferably between 0.1 and 5 μm.

Advantageously, the firing temperature is adjusted for the requirements of the present invention to between 2100 and 2400° C., and preferably between 2150 and 2300° C.

The process may further include, but not necessarily, a step of depositing, preferably by impregnation, a catalytic coating comprising an active catalytic phase, typically consisting of at least one precious metal such as Pt and/or Rh and/or Pd, and optionally an oxide such as $CeO_2$, $ZrO_2$, $CeO_2$—$ZrO_2$.

Finally, the present invention relates to the use of the structure described above as a particulate filter in an exhaust line of a diesel or gasoline engine.

The invention and its advantages will be better understood on reading the following nonlimiting examples: the filters in the following examples were synthesized starting from an initial mixture of the four following constituents:

constituent A: a first powder composed of SiC particles whose median diameter $d_{50}$ varies between 5 and 50 μm, at least 10% by weight of the particles having a diameter greater than 5 μm;

constituent B: a second powder composed of SiC particles of median diameter $d_{50}$ in the range between 0.1 and 10 μm;

constituent C: a pore-forming agent of the polyethylene type; and constituent D: an organic binder of the methyl cellulose type.

EXAMPLE 1

A first particulate filter was synthesized and tested. Firstly, 50 parts by weight of constituent A composed of a powder of SiC particles with median diameter $d_{50}$ of around 30 μm and 50 parts by weight of constituent B with a median diameter of the SiC particles of around 2.5 μm were mixed in a mixer.

Secondly, 5% by weight of constituent C with respect to the total mass of the constituents A and B and 5% by weight of constituent D with respect to the total mass of constituents A and B were added to this first mixture.

Water was added and mixing was continued until a uniform paste was obtained whose plasticity allowed it to be extruded through an extrusion die as monolithic honeycomb structures whose dimensional characteristics are given in table 1:

TABLE 1

| | |
|---|---|
| Channel geometry | Square |
| Channel density | 180 cpsi |
| | (channels per sq in, |
| | 1 inch = 2.54 cm) |
| Wall thickness | 350 μM |
| Length | 15.2 cm |
| Width | 3.6 cm |
| Volume | 2.47 liters |

Subsequently, the green monoliths obtained were dried by microwave for a time sufficient to bring the proportion of water not chemically bound to less than 1% by weight.

The channels were alternately closed off on each face of the monolith according to well-known techniques, for example those described in application WO 2004/065088.

The monolith was then fired with a temperature rise of 20° C./h until a temperature of around 2200° C. was reached, which was maintained for 2 hours.

A series of silicon carbide monoliths were finally obtained whose microstructural characteristics depended on the composition of the initial mixture and on the synthesis conditions.

The elements coming from one and the same mixture were then assembled together by bonding with a cement of the ceramic type and then machined, in order to form filters of 14.4 cm diameter in accordance with the teaching of patent application EP 816 065. The filters obtained according to this example correspond to specimen 1 in table 2.

EXAMPLES 2 TO 12

In these examples, the filter synthesis protocol described in example 1 was reproduced in an identical manner.

The differences introduced so as to modify the microstructural properties of the monoliths obtained were as follows:

various powders whose median particle diameter varied between 5 and 50 μm were used as constituent A, at least 10% by weight of the particles making up these powders having a diameter larger than 5 μm;

various powders with a median particle diameter varying between 0.1 and 10 μm were used as constituent B; and the proportions of constituents A and B were varied within the following limits:

Constituent A: from 20 to 80%,

Constituent B: from 80 to 20%, in order to obtain a first mixture comprising exclusively (100%) constituents A and B.

Secondly, constituents C and D were then added to each mixture A and B, in proportions ranging from 3 to 12% and 1 to 20% by weight, respectively, with respect to the total mass of constituents A and B.

The dimensional characteristics of the monoliths obtained after firing and of the filters obtained after assembly were identical to those given in example 1.

The specimens obtained were evaluated according to three different tests:

A—Measurement of the Soot Deposition Time:

The soot deposition time is the time required for the deposition of a sufficient quantity of soot, on a new filter or following a regeneration, in order for it to reach its maximum level of filtration efficiency.

For the measurement, the filter to be tested was installed on an exhaust line of an engine on a test bench. The engine employed was a diesel engine with a capacity of 2.0 liters. The filter was progressively loaded with soot by the operation of the engine at a speed of 3000 rpm at 50 Nm.

The bench was equipped at the exit with an ELPI (Electrical Low Pressure Impactor) system, known per se, which allowed the particulate concentration in a gas to be measured in real time starting from the moment the filter was loaded. A curve of filtration efficiency as a function of time was thus obtained, this being characterized by a quasi-plateau after a given testing time. The plateau corresponds to a filtration efficiency greater than or equal to 99%. The period of time between the start of the loading of the filter and the time from which an efficiency equal to at least 99% is obtained corresponds, according to the present invention, to the soot deposition time.

B—Measurement of the Pressure Drop:

Pressure drop, within the meaning of the present invention, is understood to mean the differential pressure existing between the upstream side and the downstream side of the filter. The pressure drop was measured according to the techniques of the prior art for an air flow of 300 m$^3$/h in an ambient air current.

C—Measurement of the Thermomechanical Resistance:

The filters were mounted on an exhaust line of a 2.0 L diesel engine running at full power (4000 rpm) for 30 minutes, then dismantled and weighed in order to determine their initial mass. The filters were then reinstalled on the engine test bench with a speed of 3000 rpm and a torque of 50 Nm for different periods of time in order to obtain soot loads of between 1 g/liter and 10 g/l in the filter.

The filters thus loaded were remounted on the line in order to undergo an intense regeneration defined as follows: after stabilization at an engine speed of 1700 rpm at a torque of 95 Nm for 2 minutes, a post-injection was performed with 70° of phasing for a post-injection flow rate of 18 mm$^3$/stroke. Once the combustion of the soot deposits had been initiated, more precisely when the pressure drop decreased over a period of at least 4 seconds, the engine speed was reduced to 1050 rpm at a torque of 40 Nm for 5 minutes in order to accelerate the combustion of the soot deposits. The filter was then subjected to an engine speed of 4000 rpm for 30 minutes in order to eliminate the remaining soot.

The regenerated filters are inspected after cutting up in order to reveal the possible presence of cracks visible to the naked eye. The limiting mass of soot thus measured, defined as the mass of soot for which the first cracks appear after severe regeneration, measures the thermomechanical resistance of the filters.

The microstructural characteristics of the samples were subsequently measured by various techniques which are well known in the art:

D—Porosimetry of the Material Forming the Walls:

The open porosity of the silicon carbide forming the walls was determined according to the conventional high-pressure mercury porosimetry techniques, with a porosimeter of the Micromeritics 9500 type. The analyses show, for all the samples tested, a unimodal distribution of the pore sizes. The median pore diameter was determined using the cumulative pore volume distribution as a function of the pore size, obtained by porosimetry measurement using the mercury porosimeter.

E—Analysis by Scanning Electron Microscopy (SEM):

The number, the nature and the size of the pores on the surface of the walls was determined by an automated image processing technique on each specimen based on photographs of a surface area of 1 mm$^2$ of wall taken by a scanning microscope in BSE (backscattered electron) mode.

The structural data and the results of the various tests obtained on specimens representative of all of the results obtained are given in table 2.

TABLE 2

| Specimen No. | Nature of the support material | Porosimetry of the SiC walls — Overall porosity | Porosimetry of the SiC walls — Median pore diameter | Surface of the walls — % Ratio: cumulative area of pores of 20-310 µm$^2$ area/total wall area | Surface of the walls — Number of pores of 20-310 µm$^2$ area per mm$^2$ of wall surface | Filter evaluation criteria — Soot deposition time (minutes) | Filter evaluation criteria — Pressure drop (pascals) | Filter evaluation criteria — Thermomechanical resistance: limiting mass of soot in g/liter of filter |
|---|---|---|---|---|---|---|---|---|
| 1 | R—SiC | 35 | 9 | 23 | 319 | 2.5 | 19 | 8.5 |
| 2 | R—SiC | 42 | 12 | 24 | 353 | 4.0 | 17 | 7 |
| 3 | R—SiC | 42 | 16 | 22 | 307 | 4.0 | 16.5 | 6.5 |
| 4 | R—SiC | 47 | 14 | 28 | 382 | 6.0 | 15 | 6 |
| 5 | R—SiC | 53 | 14 | 27 | 372 | 10 | 13 | 4 |
| 6 | R—SiC | 25 | 12 | 26 | 350 | 1.5 | 25 | 10 |
| 7 | R—SiC | 35 | 8 | 23 | 320 | 2 | 22 | 9 |
| 8 | R—SiC | 55 | 12 | 30 | 402 | 13 | 12 | <4 |
| 9 | R—SiC | 43 | 22 | 25 | 352 | 10 | 13 | <4 |
| 10 | R—SiC | 42 | 14 | 27 | 273 | 10.5 | 17 | 6 |
| 11 | R—SiC | 42 | 12 | 14 | 390 | 3.2 | 21 | 7 |
| 12 | R—SiC | 53 | 14 | 33 | 364 | 11 | 11 | 4 |

In table 2, it may be seen that specimens 1 to 5, which meet the microstructural criteria according to the invention, have satisfactory results in the various evaluation tests, suitable for them to be used as a particulate filter on an exhaust line of a diesel engine, that is to say, under the measurement conditions, a soot deposition time of 10 minutes or less, combined with a pressure drop below 20 pascals and a limiting soot mass equal to or greater than 4 g/liter. The measurements on specimens 6 to 9, given by way of comparison, show that porosity and median pore diameter values not in accordance with those described above mean that such structures cannot be used as a particulate filter.

Furthermore, the measurements on specimens 10 to 12, also given for comparison, show that wall surfaces not according to the present invention do not allow them to be used as a particulate filter.

The invention claimed is:

1. A structure, for filtering particulate-laden gases, of the honeycomb type and comprising an assembly of adjacent ducts or channels, whose axes are parallel to one another, separated by porous walls, said ducts being sealed off by plugs at one or other of their ends so as to form inlet chambers opening onto a gas entry face and outlet chambers opening onto a gas exit face, in such a way that the gas to be filtered passes through the porous walls, wherein said walls comprise material based on silicon carbide and said walls have:

an open porosity of between 30 and 53%;

a median pore diameter of between 9 and 20 µm;

the average number of open pores on the surface of the walls, the opening area of which is between 20 and 310 µm$^2$, is greater than 300 per mm$^2$ of wall; and the ratio of the total opening area of said open pores to said area of the walls is between 0.15 and 0.30.

2. The structure as claimed in claim 1, further comprising a catalytic coating for treating pollutant gases of the CO or HC type.

3. The structure as claimed in claim 1, wherein the thickness of the walls is in the range between 200 and 500 µm.

4. The structure as claimed in claim 1, wherein the pore size distribution is of the unimodal type.

5. The structure as claimed in claim 1, comprising a plurality of filtering elements in a honeycomb bonded together by a sealing cement.

6. A process for manufacturing the SiC-based filtering structure as claimed in claim 1, which comprises:

mixing an initial mixture with at least one pore-forming agent, resulting in a homogeneous product in the form of a bound paste;

extruding said product through a suitable die so as to form honeycomb monoliths; and drying the monoliths obtained;

wherein at least one of the parameters within the group consisting of the size of the particles of the initial mixture, the nature and the amount of the pore-forming agent(s) and the firing temperature, is controlled so as to obtain the structure.

7. The process as claimed in claim 6, wherein the silicon carbide is introduced in the form of a powder into the mixture, said powder having at least two types of particle size: a first population of particles, the median diameter of which is between 10 and 100 µm, and a second population of particles, the median diameter of which is between 0.1 and 10 µm.

8. The process as claimed in claim 7, wherein the median diameter of the first population of particles is between 10 and 50 µm, and the median diameter of the second population of particles is between 0.1 and 5 µm.

9. The process as claimed in claim 6, wherein the firing temperature is between 2100 and 2400° C.

10. The process as claimed in claim 9, wherein the firing temperature is between 2150 and 2300° C.

11. The process as claimed in claim 6, further comprising depositing a catalytic coating comprising an active catalytic phase on the structure.

12. The process as claimed in claim 11, wherein the step of depositing is performed by impregnation.

13. The process as claimed in claim 11, wherein the coating comprises at least one precious metal.

14. The process as claimed in claim 11, wherein the coating comprises Pt, Rh and/or Pd.

15. A particulate filter in an exhaust line of a diesel or gasoline engine comprising the structure as claimed in claim 1.

16. The particulate filter as claimed in claim 15, used in an exhaust line of a diesel engine.

17. The process as claimed in claim 6, wherein the pore-forming agent is selected from the group consisting of polyethylene, polystyrene, starch and graphite.

18. The structure as claimed in claim 1, wherein the open porosity is between 43 and 49%; the median pore diameter is between 12 and 18 m; the average number of open pores on the surface of the walls is greater than 350 per mm$^2$ of wall; and the ratio of the total opening area of the open pores to the area of the walls is between 0.20 and 0.27.

19. The structure as claimed in claim 1, wherein the median pore diameter is between 12 and 18 µm.

20. The structure as claimed in claim 1, wherein the average number of open pores on the surface of the walls is greater than 350 per mm$^2$ of wall.

* * * * *

UNITED STATES PATENT AND TRADEMARK OFFICE
CERTIFICATE OF CORRECTION

| | | |
|---|---|---|
| PATENT NO. | : 8,105,543 B2 | Page 1 of 1 |
| APPLICATION NO. | : 12/095065 | |
| DATED | : January 31, 2012 | |
| INVENTOR(S) | : Sébastien Bardon et al. | |

It is certified that error appears in the above-identified patent and that said Letters Patent is hereby corrected as shown below:

Column 2, line 54, "$m^2$" should read --$\mu m^2$--.

Column 8, line 40, "18 m;" should read --18 $\mu$m;--.

Signed and Sealed this
First Day of May, 2012

David J. Kappos
*Director of the United States Patent and Trademark Office*